United States Patent [19]

Newman

[11] 3,874,984
[45] Apr. 1, 1975

[54] PRESSURE-SENSITIVE TRANSFER ELEMENTS

[75] Inventor: Douglas A. Newman, Glen Cove, N.Y.

[73] Assignee: Columbia Ribbon and Carbon Manufacturing Co., Inc., Glen Cove, N.Y.

[22] Filed: Mar. 5, 1973

[21] Appl. No.: 337,942

Related U.S. Application Data

[62] Division of Ser. No. 167,471, July 29, 1971, abandoned.

[52] U.S. Cl. ............ 161/117, 117/7, 117/35.6, 117/36.1, 161/162, 161/164, 161/233, 161/252, 161/254, 161/402, 161/406
[51] Int. Cl. ............ B41c 1/06, B32b 3/04
[58] Field of Search ......... 161/117, 162, 164, 165, 161/252, 233, 254, 402, 411, 406; 156/229; 117/7, 36.1, 36.3, 36.4, 35.6, 36.7

[56] References Cited
UNITED STATES PATENTS

| | | |
|---|---|---|
| 3,154,461 | 10/1964 | Johnson .............................. 161/116 |
| 3,405,027 | 10/1968 | Wyckoff ............................. 161/113 |
| 3,515,626 | 6/1970 | Duffield ............................. 161/162 |
| 3,531,312 | 9/1970 | Newman ................................ 117/7 |
| 3,620,825 | 11/1971 | Lohmann ...................... 117/138.8 E |
| 3,737,354 | 6/1973 | Hattori ............................. 117/7 X |
| 3,738,904 | 6/1973 | Ikeda et al. ..................... 161/402 X |
| 3,741,841 | 6/1973 | Toyoda et al. .................. 161/252 X |
| 3,746,608 | 7/1973 | Takahashi ....................... 161/402 X |
| 3,783,088 | 1/1974 | Yoshiyasu et al. .............. 161/162 X |

Primary Examiner—Harold Ansher
Attorney, Agent, or Firm—Thomas L. Tully; Arthur A. Johnson

[57] ABSTRACT

Pressure-sensitive transfer elements comprising a plastic film foundation and a pressure-sensitive transfer layer characterized by the film foundation having oriented thereto a surface layer having excellent receptivity for the transfer layer. The surface layer comprises synthetic thermoplastic resin and solid particulate filler and is applied to the film foundation to form a combination which is stretched to cause a multiplicity of fine cracks to develop on the surface of the surface layer.

7 Claims, No Drawings

PRESSURE-SENSITIVE TRANSFER ELEMENTS

This application is a division of application Ser. No. 167,471, filed July 29, 1971, now abandoned.

Plastic films are in widespread use as foundations for pressure-sensitive transfer elements of all types, particularly typewriter carbons and ribbons. Such transfer elements have pressure-sensitive transfer layers of various types such as frangible transfer layers based upon hot-melt wax or solvent-applied resinous compositions and squeeze-out microporous layers based upon solvent-applied resinous compositions.

Plastic film foundations have many advantages over paper but at the same time have some disadvantages not possessed by paper. Plastic film is difficult to handle, cut and punch because of its smooth-oily-feeling surface and its tendency to build up a static charge. It is also difficult to apply transfer layers of uniform thickness to such films because they are not receptive to the solvents, waxes and/or oily ingredients of the transfer coating compositions, or sufficiently retentive of the transfer layer to prevent cracking, flaking or peeling of the transfer layer.

It is known to apply undercoatings of synthetic thermoplastic resin to film foundations to improve their antistatic properties and their receptivity and retentivity with respect to transfer ayers, and reference is made to my U.S. Pat. No. 3,037,879. However such undercoated products are still difficult to handle, cut and punch because of the smoothness and slippery nature of the film foundation.

It is also known to extrude special film foundations which contain filler to render them opaque and receptive, as taught by my U.S. Pat. No. 3,531,312. However such films have limitations with respect to strength and receptivity.

It is the principal object of the present invention to provide improved transfer elements having a plastic film foundation, which foundation has excellent strength and high adhesion properties for the transfer layer and has improved handling, cutting, punching and anti-static properties.

It is another object of this invention to provide transfer elements and copy or master sheets based upon plastic film foundations which have excellent strength and receptivity and have the appearance and processing properties of paper.

These and other objects and advantages of this invention will be clear to those skilled in the art in the light of the present disclosure.

The present invention relates to the discovery that improved pressure-sensitive transfer elements and master sheet units can be produced, having improved synthetic paper foundations, by coating or laminating a mono-axially oriented plastic film foundation on one or both sides with a thin stretchable layer of synthetic thermoplastic resin containing a solid particulate filler, stretching the combination in a transverse direction to a sufficient extent to cause a multiplicity of fine cracks to develop at the surface of the layer, and applying a pressure-sensitive transfer layer over the ruptured layer.

Film foundations suitable for use herein are those which are mono-axially stretched or oriented in one direction to at least about 1.5 times their original dimension and are capable of being stretched or oriented in the other direction to at least about 2 and up to about 10 times their original dimension. The preferred films are the polyolefins such as polyethylene and polypropylene. Other oriented films are also suitable including polyethylene terephthalate polyester which has not been heat-set, polystyrene, polyvinyl chloride, vinylidene chloride polymers and copolymers, and the like. Such films generally have a thickness of from about 0.5 to 2.5 mils.

The coating or laminating film may be based upon the same plastics as the base film, such as polyolenfins, polystyrene or other conventional synthetic thermoplastic resins such as vinyl chloride-vinyl acetate copolymer, vinylidene chloride polymers or copolymers, polyvinyl butyral, cellulose acetatebutyrate, and the like, and must be capable of being stretched or oriented to at least about 2 times its original dimension. The coating or film comprises from about 5 to about 50 percent by weight of the solid particulate filler, the filler particles having an average particle size of from about 5 up to about 25 microns. Preferred fillers are inorganic fillers such as clay, calcium carbonate, silica, titanium dioxide, xinc oxide, and the like. These fillers are whitish in color but other colored solids may also be used or they may be dyed any desired color. However white fillers are preferred in that they provide coatings which approximate the appearance of paper. The preferred filler content is from 15 to 30 percent by weight of the surface layer.

The surface layer preferably is applied to the film foundation by lamination as a pre-extruded film but may be applied as a coating by means of a volatile solvent which is a non-solvent for the film foundation, so as to avoid weakening the film. In the case of solutions, the solids content of the solution and the thickness of the applied coating may be varied depending upon the type of transfer element being produced. The volatile solvent is evaporated to form a uniform thin surface layer bonded to the film foundation. The strength of the bond between the foundation and the surface layer is unsatisfactory at this point, however, because the high filler content renders the surface layer somewhat brittle and frangible.

I have discovered that the strength of the bond between the surface layer and the film foundation can be remarkably improved by stretching the coated film in a direction perpendicular to the mono-axial orientation to at least about 2 and up to 10 times its original dimension to cause the filler particles to rupture the surface of the surface layer and form a multiplicity of fine cracks thereon. It is uncertain whether the improved bond is due to the film surface and the resin of the surface layer forming a more intimate contact during stretching or due to a strengthening of the cohesive properties of the resin of the surface layer. However it appears that a combination of these effects occurs, with the result that the surface layer is strongly bonded to the foundation and provides a rough filler-exposed cracked surface to which a pressure-sensitive transfer composition or an image has excellent affinity.

The surface of the surface layer of the stretched coated film is uniformly rough and has a multitude of fine cracks which provide anchoring points for the transfer layer applied thereover. If both sides of the film foundation are treated with the surface layer, the rough surface layer on the back side of the foundation renders the foundation receptive to printing inks or receptive to pressure-applied images (in the case of donor-receptor systems).

The stretching or orienting of the base film and of the laminate or coated film may be accomplished by conventional means known to those skilled in the art of plastic film formation. Generally this is accomplished by heating the film to a temperature slightly in excess of the second order transition temperature of the particular film to be stretched and tensioning the coated film between rollers to slowly stretch the film to the desired dimension. In the case of the surface layer, stretching causes the filler particles in the surface layer to break the surface and form a myriad of microscopic cracks therein. The degree of stretching will vary depending upon the thickness and filler content of the surface layer but in all cases stretching is continued at least until a substantial number of fine cracks are formed at the surface of the layer or layers. Stretching of the coated film or laminate causes the resin binder of the surface layer to be ruptured under the stress of the filler particles so that the layer develops surface cracks and opening which provide bonding points for the applied transfer layer and render the layer receptive to pressure-transfer compositions whereby the film is useful as a master sheet.

The transfer layer may be any conventional hot-melt wax composition or a solvent-applied composition, as disclosed for instance in U.S. Pat. No. 3,037,879 and 3,177,086. In the case of solvent-applied compositions, the solvent may be either insert towards or a partial solvent for the resin of the surface layer. Partial solvation is preferred in the case of squeeze-out type transfer layers since these contain a microporous resin skeletal structure which is not pressure-transferable but which releases or exudes incompatible liquid ink to a copy sheet under imaging pressure. The partial solvation provides improved solvent-bonding between the microporous resin structure and the surface layer and produces transfer elements having prolonged reusability and having suitability for reuse under heavier-than-normal printing pressures.

The following example is set forth by way of illustration and should not be considered limitative.

A sheet of polypropylene film is extruded and oriented longitudinally to 5.5 times its orginal length. The stretched film has a thickness of 3 mils and is then laminated with a continuous film of polypropylene containing 15 percent by weight of titanium dioxide and 15 percent by weight of talc and having a thickness of 1 mil.

The laminate is formed by extruding one film against the other or by passing the films together between heated rollers. The laminate is then heated to a temperature of about 90° C and passed over tensilizing rollers which stretch the laminate in a transverse direction to about 7.5 times its original width and the stretched laminate is cooled and collected on a take-up roller. At this point the laminate has an appearance and feel more similar to paper than to film. The surface layer has a relatively rough surface and a multiplicity of fine cracks uniformly distributed across the surface.

Nest a portion of the laminate is coated in conventional manner over the surface layer with the following composition to form, after evaporation of the solvents, a dried hectograph type ink layer having a weight of 4 pounds per 3,000 square feet:

| Ethyl hydroxyethyl cellulose | 5 | parts |
|---|---|---|
| Mineral oil | 8 | do. |
| Castor oil | 4.8 | do. |
| Butyl stearate | 8 | do. |
| Du Pont Spirit Black No. 3 dye | 19.2 | do. |
| Toluol | 55 | do. |

The ink layer is dried in a conventional drying tunnel to form a hectograph type layer which is pressure-transferable to a master sheet for reproduction in the spirit duplicating process.

Another portion of the laminate is cut into sheet lengths for use as a master sheet in conjunction with the aforementioned transfer sheet. The master sheet has excellent receptivity and retentivity for the composition pressure-transferred from the hectograph transfer sheet and provides better quality copy than a conventional paper master sheet due to the absence of paper fibers which tend to cause a hectograph image to broaden by leaching the oils therefrom.

The present invention provides particular advantages in the case of hectograph transfer sheets and units of such transfer sheets with master sheets having the same film base. The manufacture of such units is simplified in that the same film base is used for the transfer sheet and for the master sheet. If desired, a portion of the film base may be coated with the transfer layer and then the other portion can be folded thereover to form the unit, weakened severing lines being provided along the edge separating the sheets so that the master can be parted from the transfer sheet for duplication purposes. Alternatively the sheets can be separately cut and then joined along one edge to form the unit using a weak adhesive line.

The film base provides an excellent receptive sheet for both hectograph transfer layers and hectograph images. It is not absorbent and thus does nont drain oils from the hectograph composition. Thus the transfer layer is stable on againg and will not lose its fragibility, as happens with paper foundations, and the images formed on the master will not bleed and broaden. Also the master sheet is more resistant to background staining caused by roller pressures when the unit is fed into a typewriter for imaging.

In the case of hectograph masters consisting of the same film base as the transfer sheet, the surface layer of the film base must be one which is insoluble in the volatile solvents used in the spirit duplicating process.

It should be understood that the base film or foundation may also contain the same amounts of the same fillers suitable for use in the surface layer and that a surface layer may be coated or laminated to both sides of the foundation prior to the transverse orientation of the combination. This is a preferred embodiment in cases where it is desirable to provide a final foundation having overall properties approximating as closely as possible the appearance and receptivity of high quality paper.

Variations and modifications may be made within the scope of the claims and portions of the improvements may be used without others.

I claim:

1. An assembly comprising a pressure-sensitive transfer sheet and a copy sheet united to each other along one edge to form a unit, said transfer sheet having a flexible plastic film foundation having improved antistatic properties and having the opacity and cutting and punching properties of paper, comprising a thin biaxially-oriented plastic film which is oriented in one direction to at least about 1.5 times its original dimension, and is oriented in the other direction to at least about 2 times its original dimension, a thin monoaxially1oriented surface layer bonded to at least one surface of said film, said layer comprising a synthetic thermoplastic resin and from about 5 to 50 percent by weight of a solid particulate filler having an average particle size between about 5 and 25 microns, said surface layer being stretched to at least about 2 times its original dimension to cause the filler to break through the surface thereof and form a multiplicity of fine cracks thereon, and having a pressure-sensitive transfer layer bonded to the cracked surface of said surface layer, said copy sheet consisting of said biaxially-oriented plastic film foundation having bonded to one surface thereof said monoaxially-oriented surface layer, said layer facing and being receptive to the transfer layer of said transfer sheet under the effects of imaging pressure.

2. An assembly according to claim 1, in which the transfer layer comprises a synthetic thermoplastic resin binder material.

3. An assembly according to claim 1 in which said transfer layer is a pressure-transferable hectograph transfer layer.

4. An assembly according to claim 1, in which the surface layer and the foundation comprise polyolefin plastics.

5. An assembly according to claim 1 in which said transfer sheet and said copy sheet are individual sheet lengths which are adhered together along said one edge to form said unit.

6. An assembly according to claim 1 in which the flexible plastic film foundation of said transfer sheet and the copy sheet comprise a continuous length of the same material which is folded along said one edge at which the transfer sheet and the copy sheet are united.

7. An assembly according to claim 6 in which weakened severing lines are provided along said one edge to facilitate the separation of said sheets.

* * * * *

UNITED STATES PATENT OFFICE
CERTIFICATE OF CORRECTION

PATENT NO. : 3,874,984
DATED : April 1, 1975
INVENTOR(S) : DOUGLAS A. NEWMAN

It is certified that error appears in the above-identified patent and that said Letters Patent are hereby corrected as shown below:

Column 1, line 27, "ayers" should read -- layers --; column 3, line 30, "insert" should read -- inert --; line 62, "Nest" should read -- Next --; column 4, line 37, "nont" should read -- not --; line 39, "againg" should read -- aging --; same line, "fragibility" should read -- frangibility --; column 5, line 5, "monoaxiallylori" should read -- monoaxially-ori- --.

Signed and Sealed this twenty-second Day of July 1975

[SEAL]

Attest:

RUTH C. MASON
Attesting Officer

C. MARSHALL DANN
Commissioner of Patents and Trademarks